United States Patent
Russell

(10) Patent No.: US 9,363,388 B2
(45) Date of Patent: Jun. 7, 2016

(54) METHODS, SYSTEMS, AND COMPUTER READABLE MEDIA FOR PROVIDING TARGETED SERVICES TO TELECOMMUNICATIONS NETWORK SUBSCRIBERS BASED ON INFORMATION EXTRACTED FROM NETWORK SIGNALING AND DATA TRAFFIC

(71) Applicant: Tekelec, Inc., Morrisville, NC (US)

(72) Inventor: Travis Earl Russell, Clayton, NC (US)

(73) Assignee: TEKELEC, INC., Morrisville, NC (US)

( * ) Notice: Subject to any disclaimer, the term of this patent is extended or adjusted under 35 U.S.C. 154(b) by 0 days.

(21) Appl. No.: 14/182,722

(22) Filed: Feb. 18, 2014

(65) Prior Publication Data

US 2014/0233430 A1   Aug. 21, 2014

Related U.S. Application Data

(60) Provisional application No. 61/766,082, filed on Feb. 18, 2013.

(51) Int. Cl.
*H04J 1/16* (2006.01)
*H04M 11/08* (2006.01)
(Continued)

(52) U.S. Cl.
CPC ........... *H04M 11/08* (2013.01); *G06Q 30/0251* (2013.01); *H04L 67/22* (2013.01); *H04L 67/306* (2013.01)

(58) Field of Classification Search
CPC .................. H04M 11/08; H04L 47/10; H04L 2012/5631; H04L 47/15; H04L 47/2441; H04L 47/70; H04L 47/35; H04L 47/30; H04L 47/32; H04L 43/10; H04L 43/50; H04Q 7/34

USPC ......... 370/230, 231, 360, 370, 386, 369, 252, 370/235, 241.1, 242, 401, 402

See application file for complete search history.

(56) References Cited

U.S. PATENT DOCUMENTS 5,579,371 A   11/1996   Aridas et al.
5,724,658 A   3/1998   Hasan
(Continued)

FOREIGN PATENT DOCUMENTS

DE   198 05 261 A1   8/1999
EP   0 710 043 A1   5/1996
(Continued)

OTHER PUBLICATIONS

Chatras et al., "Mobile Application Part Design Principles," International Switching Symposium, pp. 1-9 (1990).
(Continued)

*Primary Examiner* — Brenda H Pham
(74) *Attorney, Agent, or Firm* — Jenkins, Wilson, Taylor & Hunt, P.A.

(57) ABSTRACT

Methods, systems, and computer readable media for providing targeted services to telecommunications network subscribers based on information extracted from network signaling and data traffic are disclosed. According to one aspect, the subject matter described herein includes a method for providing targeted services to telecommunications network subscribers based on information extracted from network signaling and data traffic. The method includes collecting subscriber and network related information from nodes in a telecommunications network, storing the subscriber and network related information in a repository for storing and maintaining that data, analyzing the information stored in the repository to determine subscriber interests, behaviors, and/or preferences, creating policy rules based on determined subscriber interests, behaviors, and/or preferences, and implementing the created policy rules in response to network events.

20 Claims, 2 Drawing Sheets

(51) Int. Cl.
*H04L 29/08* (2006.01)
*G06Q 30/02* (2012.01)

(56) References Cited

U.S. PATENT DOCUMENTS

| | | | |
|---|---|---|---|
| 5,915,222 | A | 6/1999 | Olsson et al. |
| 6,006,098 | A | 12/1999 | Rathnasabapathy et al. |
| 6,047,327 | A | 4/2000 | Tso et al. |
| 6,052,591 | A | 4/2000 | Bhatia |
| 6,091,958 | A | 7/2000 | Bergkvist et al. |
| 6,091,959 | A | 7/2000 | Souissi et al. |
| 6,097,960 | A | 8/2000 | Rathnasabapathy et al. |
| 6,101,387 | A | 8/2000 | Granberg et al. |
| 6,119,014 | A | 9/2000 | Alperovich et al. |
| 6,122,510 | A | 9/2000 | Granberg |
| H1895 | H | 10/2000 | Hoffpauir et al. |
| 6,134,438 | A | 10/2000 | Sawyer |
| 6,144,663 | A | 11/2000 | Hallenstal |
| 6,151,505 | A | 11/2000 | Larkins et al. |
| 6,175,743 | B1 | 1/2001 | Alperovich et al. |
| 6,327,350 | B1 | 12/2001 | Spangler et al. |
| 6,381,465 | B1 | 4/2002 | Chern et al. |
| 6,505,046 | B1 | 1/2003 | Baker |
| 6,567,658 | B1 | 5/2003 | Van De Graaf |
| 6,611,687 | B1 | 8/2003 | Clark et al. |
| 6,622,016 | B1 | 9/2003 | Sladek et al. |
| 6,650,902 | B1 | 11/2003 | Richton |
| 6,662,017 | B2 | 12/2003 | McCann et al. |
| 6,990,347 | B2 | 1/2006 | McCann |
| 7,113,781 | B1 | 9/2006 | Allison et al. |
| 7,961,622 | B2 | 6/2011 | Russell et al. |
| 8,478,828 | B2 * | 7/2013 | Craig et al. .................. 709/206 |
| 8,498,202 | B2 * | 7/2013 | Kanode et al. ............... 370/225 |
| 8,527,598 | B2 * | 9/2013 | Craig et al. .................. 709/206 |
| 8,613,073 | B2 * | 12/2013 | McCann et al. ............... 726/13 |
| 8,626,156 | B2 | 1/2014 | Marsico |
| 8,644,324 | B2 * | 2/2014 | Kanode et al. ............... 370/401 |
| 8,750,126 | B2 * | 6/2014 | McCann et al. ............. 370/236 |
| 8,792,329 | B2 * | 7/2014 | Kanode et al. ............... 370/216 |
| 8,812,020 | B2 | 8/2014 | Marsico |
| 2002/0050927 | A1 | 5/2002 | De Moerloose et al. |
| 2007/0094142 | A1 | 4/2007 | Russell et al. |
| 2008/0273679 | A1 | 11/2008 | Russell et al. |
| 2009/0075635 | A1 | 3/2009 | Russell et al. |
| 2009/0177484 | A1 * | 7/2009 | Davis et al. ........................ 705/1 |
| 2010/0192170 | A1 | 7/2010 | Raleigh |
| 2011/0116382 | A1 | 5/2011 | McCann et al. |
| 2011/0249595 | A1 * | 10/2011 | Rozov ........................... 370/259 |
| 2012/0191847 | A1 * | 7/2012 | Nas et al. ...................... 709/224 |
| 2012/0311064 | A1 * | 12/2012 | Deo ............................... 709/213 |
| 2014/0031029 | A1 | 1/2014 | Rajagopalan et al. |

FOREIGN PATENT DOCUMENTS

| | | |
|---|---|---|
| WO | WO 99/40748 | 8/1999 |
| WO | WO 01/67782 A2 | 9/2001 |

OTHER PUBLICATIONS

Decision to refuse a European Patent application for European Application No. 01922340.3 (Feb. 11, 2009).
Provision of the minutes in accordance with Rule 124(4) EPC for European Application No. 01922340.3 (Feb. 11, 2009).
Summons to attend oral proceedings pursuant to Rule 115(1) EPC for European Application No. 01922340.3 (Jul. 22, 2008).
Communication pursuant to Article 96(2) EPC for European Application No. 01922340.3 (Oct. 23, 2007).
Notice of Allowance and Fee(s) Due for U.S. Appl. No. 09/649,461 (Jul. 31, 2006).
Decision on Appeal for U.S. Appl. No. 09/649,461 (Jul. 13, 2006).
Examiner's Answer for U.S. Appl. No. 09/649,461 (Feb. 17, 2006).
Order Returning Undocketed Appeal to Examiner for U.S. Appl. No. 09/649,461 (Nov. 7, 2005).
Examiner's Answer for U.S. Appl. No. 09/649,461 (Apr. 19, 2005).
Advisory Action for U.S. Appl. No. 09/649,461 (Nov. 18, 2004).
Final Official Action for U.S. Appl. No. 09/649,461 (Mar. 30, 2004).
International Preliminary Examination Report for International Application No. PCT/US01/07828 (Oct. 8, 2003).
Non-Final Official Action for U.S. Appl. No. 09/649,461 (Jul. 28, 2003).
Final Official Action for U.S. Appl. No. 09/649,461 (Apr. 11, 2003).
Notification of European Publication No. and Information on the Application of Article 67(3) EPC for European Application No. 01922340.3 (Nov. 6, 2002).
Non-Final Official Action for U.S. Appl. No. 09/649,461 (Oct. 18, 2002).
"Digital Cellular Telecommunications System (Phase 2+); Technical Realization of the Short Message Service (SMS); (GSM 03.40 version 7.4.0 Release 1998)," ETSI TS 100 901, V7.4.0 (Dec. 1999).
Digital Cellular Telecommunications System (Phase 2+); Location Registration Procedures, (GSM 03.12 version 7.0.0 Release 1998), ETSI TS 100 530, V7.0.0 (Aug. 1999).
Urs, "Roaming Notification and Local Service Control Through Short Message Service," Motorola Technical Developments, vol. 34, pp. 17-19 (Mar. 1, 1998).
"Digital Cellular Telecommunications System (Phase 2+); Mobile Application Part (MAP) Specification (GSM 09.02)," ETS 300 974 (May 1997).
Eagle Feature Guide, P/N 910-1225-01, Revision A, Tekelec, Mar. 1996.

* cited by examiner

METHODS, SYSTEMS, AND COMPUTER READABLE MEDIA FOR PROVIDING TARGETED SERVICES TO TELECOMMUNICATIONS NETWORK SUBSCRIBERS BASED ON INFORMATION EXTRACTED FROM NETWORK SIGNALING AND DATA TRAFFIC

PRIORITY CLAIM

This application claims the benefit of U.S. Provisional Patent Application Ser. No. 61/766,082, filed Feb. 18, 2013; the disclosure of which is incorporated herein by reference in its entirety.

TECHNICAL FIELD

The subject matter described herein relates to methods and systems for providing personalized services to telecommunications network subscribers. More particularly, the subject matter described herein relates to methods, systems, and computer readable media for providing targeted services to telecommunications network subscribers based on information extracted from network signaling and data traffic.

BACKGROUND

Network operators are approaching the last of three main revenue waves: voice revenue derived from basic voice communication and mobility; messaging revenue generated by peer-to-peer short message service (SMS); and access revenue driven largely by data demand. To make the most of disruptive internet service models and over-the-top (OTT) service models and to become true digital lifestyle providers, mobile operators first need to intimately understand their subscribers—what engages them, what disenchants them, what moves and inspires them—not only as individuals, but also as members of communities and groups in an increasingly mobile and social-media-oriented world.

One valuable source of information from which such knowledge could be gleaned is the virtual treasure trove of contextually rich subscriber data that operators possess. However, operators must have some way to not only store this vast amount of information but also organize and access extremely heterogeneous and unstructured data. Furthermore, in order to become digital lifestyle providers, operators also need to have the capability to mine the potentially enormous volumes of data at their disposal and extract information about subscriber behaviors that operators can then use to provide targeted services. Finally, operators also need the ability to apply this knowledge throughout their network and even across multiple networks.

Thus, in order to be digital lifestyle providers, operators need to have these four capabilities: 1) a source of subscriber data; 2) a place to store and organize this data; 3) the ability to analyze this data to determine subscriber preferences, behaviors, wants, and needs; and 4) the means to apply this knowledge to the network. In short, there is need for a network infrastructure that can provide these capabilities.

SUMMARY

According to one aspect, the subject matter described herein includes a method for providing targeted services to telecommunications network subscribers based on information extracted from network signaling and data traffic. The method includes collecting subscriber and network related information from nodes in a telecommunications network, storing the subscriber and network related information in a repository for storing and maintaining that data, analyzing the information stored in the repository to determine subscriber interests, behaviors, and/or preferences, creating policy rules based on determined subscriber interests, behaviors, and/or preferences, and implementing the created policy rules in response to network events.

According to another aspect, the subject matter described herein includes a system for providing targeted services to telecommunications network subscribers based on information extracted from network signaling and data traffic. The system includes: a repository for storing subscriber and network related information; a telecommunications network node for sending and receiving network traffic, the node configured to extract subscriber and network related information from received network traffic and transmit the extracted information to the repository; a policy analytics engine for analyzing information stored in the repository to determine subscriber interests, behaviors, and/or preferences and for creating policy rules based on determined subscriber interests, behaviors, and/or preferences; and a policy node for implementing the created policy rules in response to network events.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media for providing targeted services to telecommunications network subscribers based on information extracted from network signaling and data traffic are provided. Reference will now be made in detail to exemplary embodiments of the present invention, examples of which are illustrated in the accompanying drawings. Wherever possible, the same reference numbers will be used throughout the drawings to refer to the same or like parts.

Figure 1:
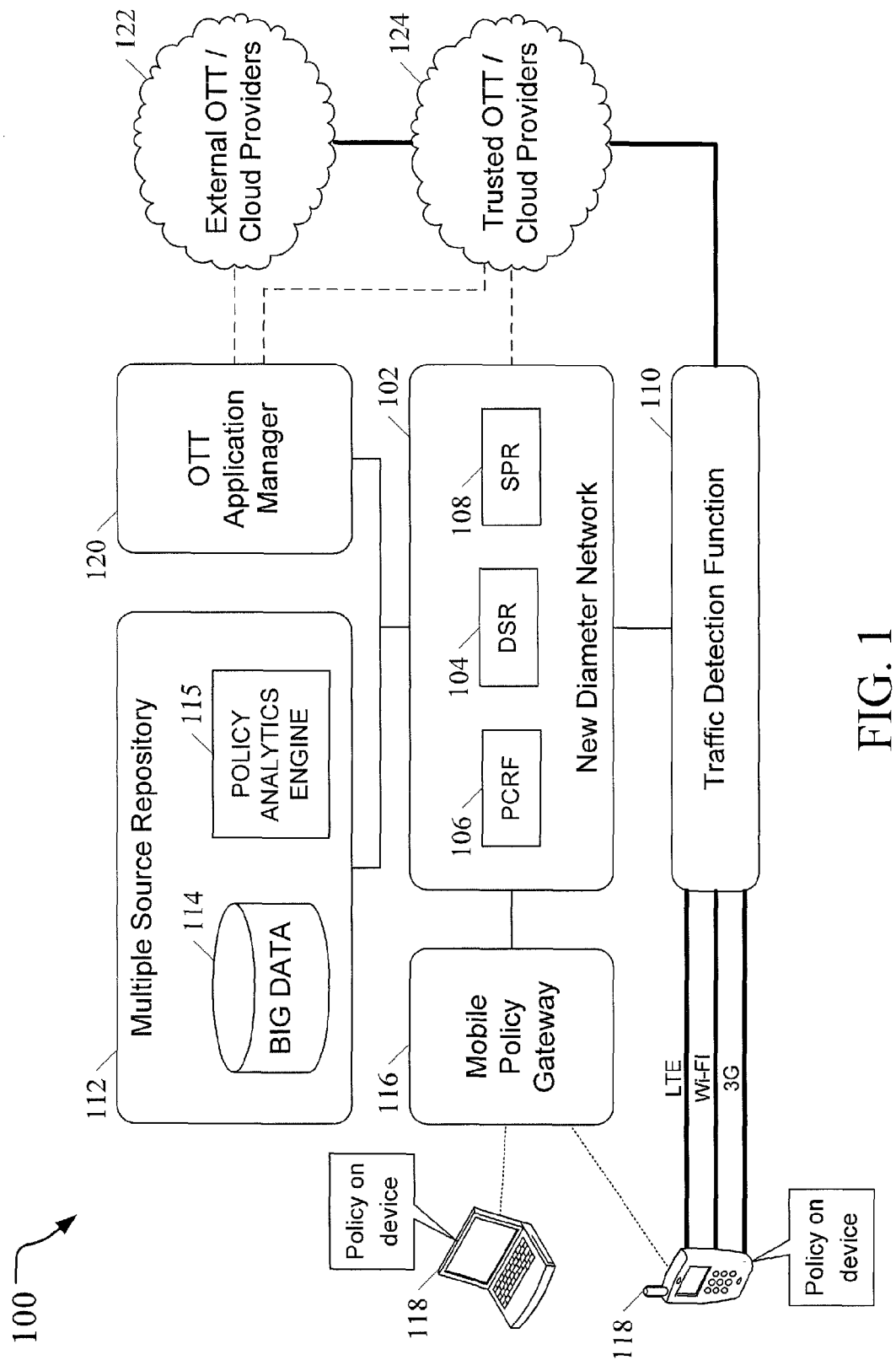
FIG. 1 is a block diagram illustrating an exemplary system for providing targeted services to telecommunications network subscribers based on information extracted from network signaling and data traffic according to an embodiment of the subject matter described herein.

In order to be digital lifestyle providers, operators need to have four capabilities: a source of subscriber data, a place to store and organize this data, the ability to analyze this data to determine subscriber preferences, behaviors, wants, and needs, and the means to apply this knowledge to the network. FIG. 1 illustrates a network infrastructure that provides these capabilities.

FIG. 1 is a block diagram illustrating an exemplary system for providing targeted services to telecommunications network subscribers based on information extracted from network signaling and data traffic according to an embodiment of the subject matter described herein.

A Capable Network Infrastructure

In the embodiment illustrated in FIG. 1, system 100 includes a new Diameter network (NDN) 102, which orchestrates Diameter-based communications among policy servers, Diameter signaling routers, subscriber databases, gateways, charging systems, and mobility management functions. In the embodiment illustrated in FIG. 1, NDN 102 includes a Diameter signaling router (DSR) 104, a policy and charging rules function (PCRF) 106, and a subscriber profile repository (SPR) 108.

DSR 104 is the "central nervous system" of mobile data networks that improves subscribers' mobile data access, security and quality of service. In one embodiment of NDN 102, all Diameter signaling messages go through one or more DSRs. The Diameter protocol does more than the remote authentication dial-in user service (RADIUS) protocol that it replaced—in addition to authorization, charging, and QoS, the Diameter protocol is continually being extended and may be used to transfer other types of information.

PCRF 106 encompasses policy control decision and flow based charging control functionalities. PCRF 106 provides network control regarding the QoS and flow based charging. When PCRF 106 receives service information from an application function (AF), PCRF 106 may check whether the AF is allowed to pass the application/service information to PCRF 106. PCRF 106 controls how a certain service data flow that is under policy control is treated, e.g., discarded, etc., and ensure that the user plane traffic mapping and treatment is in accordance with the user subscription profile. PCRF 106 may check that the service information provided by the AF is consistent with the operator defined policy rules before storing the service information. PCRF 106 includes a sophisticated rules engine that allows marketers, IT departments and network engineers to rapidly create new policy rules.

SPR 108 contains all subscriber/subscription related information needed for subscription-based policies and bearer level charging rules by PCRF 106. PCRF 106 may use the subscription information as basis for the policy and charging control. The subscription information can be used for both session based and non-session based services. The subscription specific information for each service may contain e.g. max QoS class and max bit rate for each APN the subscriber has access permission to and for each charging key of the subscriber.

Thus, NDN 102 provides the backbone or framework upon which a digital lifestyle provider network can be built. It does so by working closely with Diameter network elements including advanced subscriber databases and Diameter signaling routers. For that reason, the triumvirate of Policy Servers (PCRFs), Diameter Signaling Routers (DSRs) and subscriber profile databases will become harmonized within a dedicated Diameter control layer through which operators can grow and shrink capacity, and monetize assets according to what they learn in real-time about subscribers, applications and services.

A Source of Subscriber Data

In the embodiment illustrated in FIG. 1, the role of DSR 104 at the center of signaling plane traffic makes it uniquely suited to have access to an extraordinarily rich source of information about subscribers, including information about the subscriber's equipment and location, the subscriber's hours of operation, the kind of services the subscriber uses, the media content the subscriber views, and other information that can be garnered from control/signaling plane messages. Other network nodes may also be a source valuable information. For example, a mobility management entity (MME) may provide information such as subscriber ID, subscriber IMEI, visited network ID, access node location (both GPS data from the UE and triangulation data from cell phones, provided by MLS), and time zone. PCRF 106 provides information such as QoS, type of data connection (e.g., 3G, 4G, WiFi, etc.), allocated/guaranteed bandwidth, charging information (e.g., class of subscriber, quota for prepaid customers, policy information such as whether data access is allowed or not, parental controls, and so on. Conventional deep packet inspection (DPI) functions can provide information about the data stream itself, such as URLs, domain names, media stream identifiers, and other information available on the data or bearer plane.

In one embodiment, a traffic detection function (TDF) 110 characterizes media flows for selected, high-value services at a much more granular level than is available with today's deep packet inspection (DPI) and video optimization functions. This enables superior personalization of application-based services. In one embodiment, TDF 110 detects what kind of media is being transmitted and also enforces QoS for that media. TDF 110 may control aspects of the content delivery network, such as video optimization.

A Place to Store and Organize this Data

A multiple source repository (MSR) 112 includes a high-throughput database 114 based on the latest advances in "big data" technology and advanced analytics. It enables operators to collect large volumes of subscriber and relevant network data via a highly scalable, high-throughput database based on the latest advances in big data technology. MSR 112 can accept real-time feeds from multiple network sources without any service impacts to determine subscriber behaviors, norms, preferences and social connections. For example, DSR 104 may receive Diameter messages, duplicate them or extract information from them, and send the duplicate or extracted information to MSR 112. Likewise, TDF 110 may send to MSR 112 information about what subscribers are watching, where they are going, what they are buying, and other subscriber-related information.

MSR 112 may get information from any source, including other nodes and nodes that use other protocols. For example, switches, gateways, routers, and signaling transfer points may provide MSR 112 with information about the network and its performance, including indications of failure and congestion, identification of traffic patterns (time of day, day of the week, etc.) In one embodiment, database 114 stores both structured and unstructured data.

The Ability to Analyze this Data to Determine Subscriber Interests, Preferences, Behaviors, Wants, and Needs MSR 112 may include a policy analytics engine 115 for processing the vast amounts of data stored within MSR 112 to unlock network intelligence buried in millions of policy event records so operators can create targeted service offers based on subscribers' usage, pricing and quality of service preferences. This capability provides the tools to unlock a trove of subscriber data. It encompasses analytics capabilities to determine subscriber interests, behaviors, norms, preferences, and connections. MSR 112 provides the capability to draw inferences between subscriber individual behaviors, subscriber group behaviors, and network status. For example, analysis of data within database 114 might reveal that a particular subscriber demographic is responsible for a large percentage of traffic during peak congestion times, in which case the operator may offer subscribers in that demographic discounted data rates during off-peak hours, in order to ease congestion.

MSR 112 also provides a mechanism by which third-party information requests are verified against subscriber privacy preferences, allowing operators to safely and securely share subscriber data while protecting subscriber privacy.

The Means to Apply this Knowledge to the Network

Operator influence of the full subscriber experience means that network rules need to extend everywhere, down to the millions of smartphones, tablets and other connected devices on the network. This is referred to as "Policy Everywhere". The Policy Everywhere approach means operators enforce policy wherever it is needed, including on mobile devices. They define policy centrally within an intelligent, independent control layer to apply policy rules across networks, devices and applications. For example, policy decisions made by PCRF 106 may be applied throughout NDN 102.

In conventional Diameter networks, however, policy does not extend out to the device, giving rise to potential inefficiencies. For example, in a conventional Diameter network, a request for a data connection sent from a mobile subscriber 118 will traverse the access network until it reaches a gateway node between the access network and the core Diameter network. The gateway node may request a policy decision from PCRF 106 and apply that policy to deny the data connection, for example, but even this requires resources within the radio and access networks—i.e., to make the request that is eventually denied. To avoid this inefficiency, system 100 includes the ability to extend policy out to the device.

In one embodiment, this capability is provided by a mobile policy gateway (MPG) 116 that extends policy directly to devices 118, which may be personal computers, mobile devices, etc. Extending policy out to the device allows operators to do things such as manage mobile and Wi-Fi network selection based on subscriber tier, device type, application usage or network conditions, manage chatty applications, and improve security. It also provides personalized application controls at the device for a better customer experience. For example, MPG 116 may instruct mobile device 118 to select between an LTE network, a Wi-Fi network, and a 3G network, depending on subscriber information, such as the class of subscriber, as well as network information, such as the availability of alternative access networks, local congestion, and the like.

Within NDN 102, policy gains awareness of what the network, subscribers, applications and devices are doing at any given time because it is more centrally defined and independent of underlying network infrastructure. This awareness and independence affords policy the chance to become the brain of IP networks. The awareness and hence intelligence is brought on by Diameter signaling, with DSRs becoming the central nervous system constantly exchanging messages among policy servers, charging systems, subscriber databases and gateways to monetize services. Dynamic information is fed to subscriber profile repositories. These repositories act as the memory by storing profile, state, behavioral and usage data that can be used for further personalization of services.

Additional Monetary Benefits

The information maintained within MSR 114 is a potentially lucrative source of income to a network operator, who may further monetize this resource by offering it to OTT/cloud service providers.

In one embodiment, system 100 may include an over-the-top application manager (OTTAM) 120 that interfaces with MSR 114, allowing operator-controlled or third-party OTT services to securely retrieve subscriber intelligence via standard, open application interfaces. Using this function, operators can access subscriber intelligence without impacting ongoing MSR data collection operations. It has a low enough latency to support services that interact directly with consumers such as real-time bidding in display advertising. OTT service providers may be trusted providers 122 that communicate with NDN 102 (e.g., are nodes within the same network as NDN 102), or external providers 124, which do not communicate with NDN 102.

The ability to monetize that data depends on the sophistication with which operators apply policy to enrich apps and services. To get the answers, operators will extend the reach of policy beyond core networks to the ever-expanding frontiers of Smart, connected devices, Machine-to-machine (M2M) devices, and OTT, cloud and service delivery platforms. In essence, operators will take policy everywhere.

Although OTT service providers have some insight into the behavior of their subscribers, this insight is based on information that may only be collected by the OTT service provider while the subscriber is consuming the OTT service. In contrast, operators' access to this information is not limited in this manner. For example, operators know when the subscriber powers the device on or off, when a mobile subscriber moves out of the range of one Mobile Switching Center (MSC) and into the range of another MSC, which an OTT provider does not know.

Thus, system 100 has the capability to enable operators to create, personalize and launch new services faster; add value to and share revenues with mobile advertisers, over-the-top (OTT) application and device providers; accelerate cloud and machine-to-machine (M2M) services growth; manage the explosion in data and signaling traffic; and reduce network congestion and balance traffic across access networks. The ability to enforce rules around charging, authentication and authorization in such an extensive way will elevate policy from its predominant role of monitoring monthly quotas and fair-use management to a role of enabling new digital lifestyle services and business models flexible enough to support best effort internet, OTT subsidized data, M2M, and cloud services. The goal is to gain the type of control that empowers operators to build new use cases, the type of which can:

Relieve congestion on licensed spectrum through intelligent Wi-Fi offload, which would be based on preferential network access, subscriber tier or type, device, application, quota, or network conditions. For example, an operator may match the type of service—video versus voice versus text—with the best available access technology, or defer the delivery of a service until a suitable access technology is available.

Influence subscribers' data experiences, triggering innovation around subsidized or toll-free data, opt-in mobile advertising, customer loyalty/rewards programs, and application-based plans with partner ecosystems. For example, using knowledge of a user's opt-in preferences and daily behavior, an operator may deliver content during leisure hours.

Engender provisioning of policy as a service to OTT application providers.

In lifestyle-oriented environments, operators don't just passively facilitate the flow of services among subscribers and OTT service providers, but rather actively push what, when, where, and how services are offered to particular subscribers, based on many factors including specific usage behavior, preferences, and service agreements. Though the network remains a critical differentiator in this evolution, it is the unified view of dynamic and static subscriber data from the network and big data sources that become operators' biggest asset. It makes them more valuable as enablers to third parties such as OTT players, mobile advertisers, app creators, content providers or verticals like healthcare, utilities and automotive—all of which seek to converge big data into something people care about on a personal level.

a multiple source repository unleashes the vast amount of dynamic subscriber data that is generated every second; it is the data that tells you what engages, what moves and what inspires your subscribers as individuals and as members of social communities. And it combines that rich data with advanced policies to deliver high value, personalized and contextual services. Mobile operators can leverage network and subscriber intelligence to provide valuable opt-in, mobile advertising, and other personalized offers to over-the-top application and content providers. This paves the way for them to become digital lifestyle providers. For example, MobileSocial™ allows operators to tap into vast new revenue streams and to leverage network and subscriber intelligence to provide valuable services, including:

Opt-in advertisements, offers, and new service recommendations that are personalized to the individual and contextually relevant.

Subsidized mobile data access sponsored either by ads or third-parties with analytics about service usage.

Integrated loyalty programs with business partners.

Consumer and enterprise cloud services, including policy and identity as a service.

Example Application: Mobile Advertisement Insertion

The combination of Policy Everywhere with Big Data+ Policy Analytics has extraordinarily broad potential application. To give just one example, an operator may provide targeted services to telecommunications network subscribers based on information extracted from network signaling and data traffic. The first step would include collecting subscriber and network related information from nodes in a telecommunications network. This information could be provided by nodes within NDN 102, such as DSR 104, PCRF 106, and SPR 108, as well as from TDF 110. For example, DSR 104 may be configured to send copies of Diameter or other signaling message traffic to MSR 114; TDF 110 likewise could send to MSR 114 information about data traffic.

The information provided by the various nodes are received by MSR 114 and stored there. Policy analytics engine 115 then analyzes the information stored in the repository to determine subscriber behaviors and preferences. The knowledge and information so gleaned may be used to create policy rules based on determined subscriber behaviors and preferences. For example, it may be determined that a subscriber often goes to a particular chain of coffee shops and while there uses that shop's Wi-Fi for internet access. From this it can be inferred that the subscriber may be interested in special discounts or coupons for use at those stores.

A simple example of policy in action could be that, as that subscriber roams, it may be determined that the subscriber is approaching one of that chain's stores, and a mobile advertisement may be pushed to that subscriber's smart phone, for example, to alert the subscriber of the proximity of his or her favorite coffee shop, to offer that subscriber a coupon or discount. In this example, the mobile policy gateway 116 could even change policy on the subscriber's device to provide that subscriber with a higher quality of service internet connection (e.g., faster download speeds, reduced cost per megabyte data plans, etc.) from the coffee shop's wireless access point.

Figure 2:
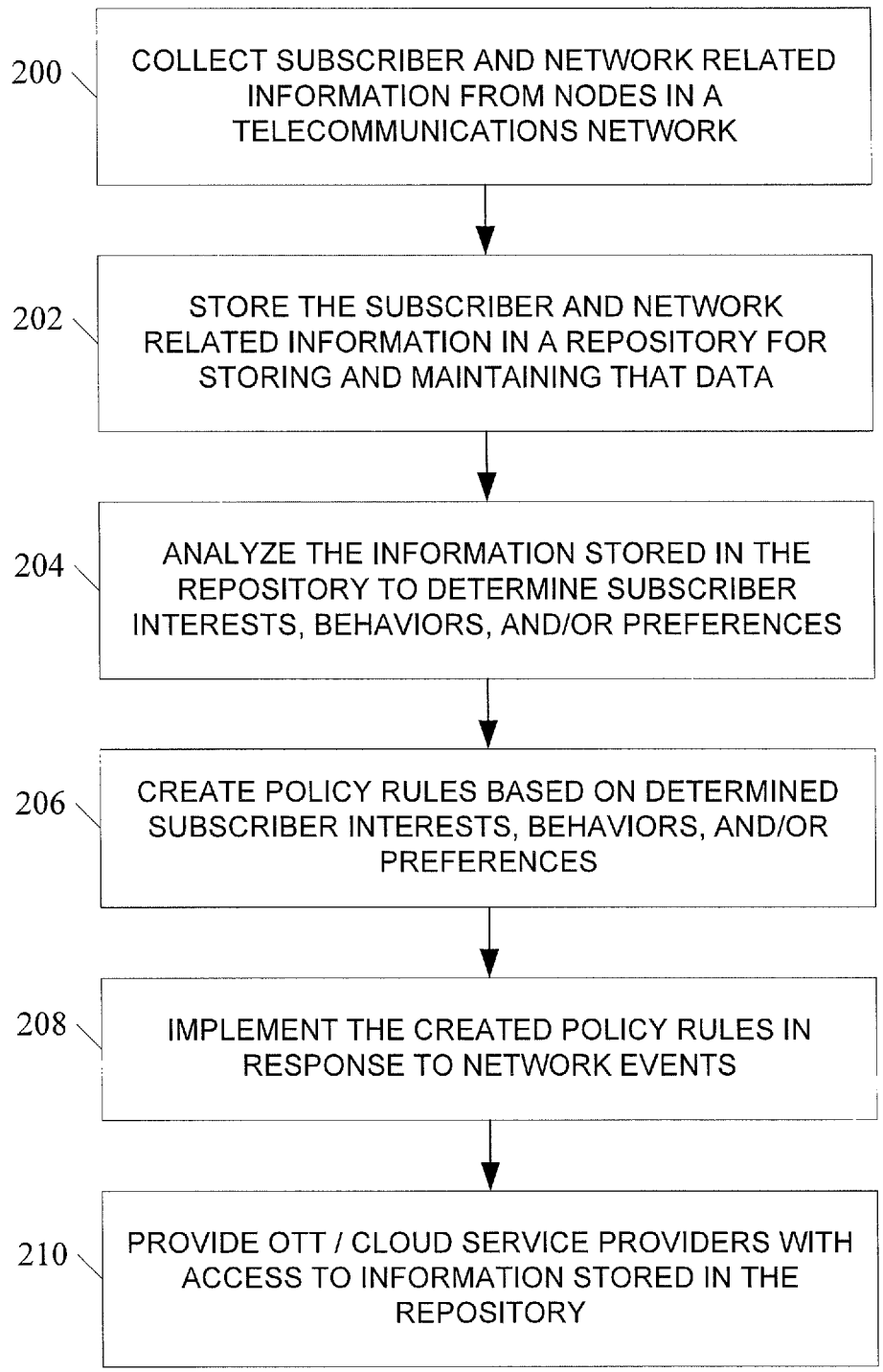
FIG. 2 is a flow chart illustrating an exemplary process for providing targeted services to telecommunications network subscribers based on information extracted from network signaling and data traffic according to an embodiment of the subject matter described herein.

FIG. 2 is a flow chart illustrating an exemplary process for providing targeted services to telecommunications network subscribers based on information extracted from network signaling and data traffic according to an embodiment of the subject matter described herein. In the embodiment illustrated in FIG. 2, the process includes, at step 200, collecting subscriber and network related information from nodes in a telecommunications network. At step 202, the subscriber and network related information is stored in a repository for storing and maintaining that data. At step 204, the information stored in the repository is analyzed to determine subscriber behaviors and preferences. At step 206, policy rules are created based on determined subscriber behaviors and preferences. At step 208, the created policy rules are implemented in response to network events. In one embodiment, at step 210, OTT/cloud service providers are provided access to the subscriber and network related information that is stored in the repository.

In one embodiment, methods, systems, and computer readable media for providing targeted services to telecommunications network subscribers based on information extracted from network signaling and data traffic make use of the capability of a telecommunications network operator to make copies of Diameter signaling messages and send them to a repository for storage. The stored data can then be mined for information, such as:

Subscriber interests, based which websites the subscriber visits, which media the subscriber downloads or purchases, subscriber location at the time of the activity (what he views at work versus what he views at home, etc.);

Popularity of websites or media providers; and

Popularity of particular media content.

The mined information may be used to:

Send targeted ads to the subscriber based on the subscriber's interest and/or location;

Provide information to media providers about website popularity;

Provide information to media providers about media content popularity; and

Provide information to advertisers about individual subscriber interests and/or mass trends.

The information may be provided by the DSR, by other nodes that support the Diameter protocol, or both. The information may be provided via a Diameter interface and/or other types of interfaces. The information may be stored in structured format, unstructured format, or both.

The methods and systems described herein can take advantage of very, very large amounts of data. By collecting large amounts of data from many different data sources and/or of many different data types, valuable information may be determined. This "big data" concept provides a mechanism by which a subscriber's preferences may be determined without requiring the subscriber to explicitly convey those preferences. Instead, a subscriber's preferences may be divined based on the subscriber's behavior. The subscriber may not even be consciously aware of his or her own preferences, but such preferences may nevertheless be determined through analysis of the subscriber's activity. Thus, big data provides a means to determine information about a subscriber without a priori knowledge of the subscriber. Moreover, information about a subscriber's preferences may be determined without knowing the actual identity of the subscriber. By extension, the behavior and preferences of groups of subscribers, anonymous or otherwise, may be detected. In this manner, trends may be detected by big data analysis, and anonymized trend data may be created by scrubbing subscriber identifiers, if present, from the output.

The Diameter protocol is uniquely positioned as a rich source of information, because the Diameter protocol spans many interfaces, each of which may have its own subset of AVPs. For example, the S6a interface is defined as the signaling interface between an MME and a PCRF. The S6a interface uses about 15 different AVPs. The interface between a PCRF and a GGSN(3G)/PGW(4G), on the other hand, uses about 45 different AVPs, some of which may be the same as used by the S6a interface. The methods and systems described herein have the ability to select some or all of the AVPs that are to be collected and sent to the repository.

Furthermore, different information is provided by different nodes. For example, an MME can provide information such as subscriber ID, subscriber IMEI, visited network ID, access node location (GPS data from UE, triangulation data from cell phones, provided by MLS), and time zone. A PCRF (policy and charging rules function) can provide information such as QoS, type of data connection (3G/4G, WiFi, etc.), allocated/guaranteed bandwidth, charging info (class of subscriber, quota for prepaid customers, policy (data access allowed or not, etc.), parental controls, etc. A DPI (deep packet inspection) can provide information about the data stream itself, such as URLs, domain names, media stream identifiers, etc.

The methods and systems described herein provide other advantages, as well. For example, in one embodiment, a system for providing targeted services to telecommunications network subscribers based on information extracted from network signaling and data traffic can operate continuously or continually. Because such as system does not target any particular subscriber, there is no triggering mechanism, such as registration, i.e., it may simply run full time.

Although the methods and systems disclosed herein are illustrated using network elements that typically have Diameter interfaces, the concepts described herein are not so limited. For example, in FIG. 1, TDF 110 sends data through DSR 104 or other node in the Diameter network 102 on its way to MSR 112, i.e., via the Diameter protocol. However, TDF 110 could send data directly to MSR 112 and bypass DSR 104 and/or the Diameter network 102 entirely.

The methods and systems disclosed herein have a number of beneficial applications that are made possible by big data analysis. These applications include:
Scoring the popularity of a media provider (which may be a website);
Scoring the popularity of a particular media content, such as a video, tweet, text message, email, etc.;
Using demographic data to target ads to a subscriber, which may be based on subscriber, equipment type (e.g., iPhone/iPad/Android) and/or access type (e.g., WiFi/3G/4G.)

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing targeted services to telecommunications network subscribers based on information extracted from network signaling and data traffic, the method comprising:
collecting subscriber and network related information from nodes in a telecommunications network, wherein collecting subscriber and network related information from nodes in a telecommunications network includes receiving Diameter signaling messages at a Diameter signaling router (DSR), duplicating or extracting information from the Diameter signaling messages at the DSR, and sending the duplicated messages or extracted information to a multi-source repository (MSR);
storing the subscriber and network related information in the MSR;
analyzing the information stored in the MSR to determine subscriber interests, behaviors, or preferences;
creating policy rules based on determined subscriber interests, behaviors, or preferences; and
implementing the created policy rules in response to network events, wherein implementing the policy rules includes providing the policy rules to a mobile policy gateway (MPG) that extends policy to mobile devices, wherein at least one of the policy rules changes a policy on a mobile device to provide the mobile device with a higher quantity of service network connection.

2. The method of claim 1 wherein collecting and storing subscriber and network related information comprises extracting subscriber and network related information from network signaling messages.

3. The method of claim 2 wherein extracting subscriber and network related information from network signaling messages comprises, at the DSR, extracting the subscriber and network related information from the received Diameter signaling messages, and sending the extracted information to the MSR.

4. The method of claim 1 wherein collecting and storing subscriber and network related information comprises extracting subscriber and network related information from network bearer traffic.

5. The method of claim 4 wherein extracting subscriber and network related information from network bearer traffic comprises using a traffic detection function to perform deep packet inspection of data packets.

6. The method of claim 1 wherein collecting and storing subscriber and network related information comprises collecting and storing information about a status of the network.

7. The method of claim 6 wherein the information about the status of the network includes information about at least one of:
operational status of a node;
operational status of a link;
traffic capacity or congestion;
observed trends in traffic capacity or congestion; and
predicted trends in traffic capacity or congestion.

8. The method of claim 1 wherein analyzing the information stored in the to determine subscriber behaviors and preferences comprises at least one of:
scoring the popularity of a media provider;
scoring the popularity of particular media content;
determining the interests, behaviors, or preferences of a subscriber; and
determining the interests, behaviors, or preferences of a subscriber demographic.

9. The method of claim 1 wherein creating policy rules includes using network related information to create the policy rules.

10. The method of claim 1 wherein creating policy rules based on determined subscriber behaviors and preferences includes using demographic data to target ads to a subscriber.

11. The method of claim 10 wherein targeting ads to a subscriber is based on at least one of:
 a subscriber attribute, characteristic, behavior or location;
 a subscriber equipment type; and
 an access or access network type.

12. The method of claim 1 wherein implementing the created policy rules in response to network events comprises at least one of:
 providing targeted ads to a subscriber;
 informing a subscriber of alternative access modes;
 instructing a subscriber's device to select one of a plurality of available access modes;
 controlling a subscriber's access to network services; and
 controlling or adjusting a subscriber's billing rate.

13. The method of claim 1 comprising providing, to over the top/cloud service providers, access to information stored in the repository.

14. A system for providing targeted services to telecommunications network subscribers based on information extracted from network signaling and data traffic, the system comprising:
 a multi-source repository (MSR) for storing subscriber and network related information;
 a telecommunications network node for sending and receiving network traffic, the node configured to extract subscriber and network related information from received network traffic and transmit the extracted information to the MSR, wherein the telecommunications network node comprises a Diameter signaling router (DSR) for receiving Diameter signaling messages, duplicating or extracting information from the Diameter signaling messages at the DSR, and sending the duplicated messages or extracted information to a multi-source repository (MSR);
 a policy analytics engine for analyzing information stored in the repository to determine subscriber interests, behaviors, or preferences and for creating policy rules based on determined subscriber interests, behaviors, or preferences; and
 a policy node for implementing the created policy rules in response to network events, wherein the policy node comprises a mobile policy gateway (MPG) that extends policy to mobile devices, wherein at least one of the policy rules changes a policy on a mobile device to provide the mobile device with a higher quantity of service network connection.

15. The system of claim 14 wherein the repository supports structured and unstructured data.

16. The system of claim 14 wherein the MSR is configured to receive the subscriber and network related information from at least one of the following nodes in addition to the DSR:
 a policy and charging rules function (PCRF);
 a subscriber profile repository (SPR);
 a traffic detection function (TDF);
 a deep packet inspection (DPI) function;
 a gateway;
 a gateway controller;
 a signaling transfer point;
 a switch;
 a router;
 a mobility management entity (MME);
 a node in a 3G, 4G, 5G, or 6G network; and
 a node in SIP or IMS network.

17. The system of claim 14 wherein the policy node comprises a mobile policy gateway for pushing policy rules to devices using the telecommunications network.

18. The system of claim 14 including an over-the-top (OTT) application manager for providing subscriber and network related information to OTT/cloud service providers.

19. The system of claim 18 wherein the OTT application manager provides access to subscriber and network related information via a secure, open application interface.

20. A non-transitory computer readable medium having stored thereon executable instructions that when executed by the processor of a computer control the computer to perform steps comprising:
 collecting subscriber and network related information from nodes in a telecommunications network, wherein collecting subscriber and network related information from nodes in a telecommunications network includes receiving Diameter signaling messages at a Diameter signaling router (DSR), duplicating or extracting information from the Diameter signaling messages at the DSR, and sending the duplicated messages or extracted information to a multi-source repository (MSR;
 storing the subscriber and network related information in the MSR;
 analyzing the information stored in the MSR to determine subscriber interests, behaviors, or preferences;
 creating policy rules based on determined subscriber interests, behaviors, or preferences; and
 implementing the created policy rules in response to network events, wherein implementing the policy rules includes providing the policy rules to a mobile policy gateway (MPG) that extends policy to mobile devices, wherein at least one of the policy rules changes a policy on a mobile device to provide the mobile device with a higher quantity of service network connection.

\* \* \* \* \*